US011554701B2

(12) United States Patent
Oyama et al.

(10) Patent No.: US 11,554,701 B2
(45) Date of Patent: Jan. 17, 2023

(54) DRIVING ASSISTANCE APPARATUS

(71) Applicant: Mazda Motor Corporation, Hiroshima (JP)

(72) Inventors: Ryo Oyama, Hiroshima (JP); Takeshi Sasaki, Hiroshima (JP); Masaaki Aoki, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 17/555,572

(22) Filed: Dec. 20, 2021

(65) Prior Publication Data
US 2022/0219654 A1 Jul. 14, 2022

(30) Foreign Application Priority Data
Jan. 13, 2021 (JP) .............................. JP2021-003547

(51) Int. Cl.
*B60N 2/75* (2018.01)
*B60T 7/08* (2006.01)
*G05G 1/02* (2006.01)
*G05G 1/58* (2008.04)
*G05G 1/62* (2008.04)

(52) U.S. Cl.
CPC ................ *B60N 2/787* (2018.02); *B60T 7/08* (2013.01); *G05G 1/025* (2013.01); *G05G 1/62* (2013.01)

(58) Field of Classification Search
CPC . G05G 1/025; G05G 1/54; G05G 1/62; B60N 2/78; B60N 2/787; B60T 7/08; B60T 7/10
See application file for complete search history.

(56) References Cited

U.S. PATENT DOCUMENTS 4,997,054 A * 3/1991 Denny ..................... B60N 2/77
248/118
7,600,819 B2 * 10/2009 Armo ..................... B60N 2/797
297/411.3

FOREIGN PATENT DOCUMENTS

| DE | 19607398 C1 * | 1/1998 | ............. B60K 37/06 |
|----|---------------|--------|-----|
| DE | 10115964 A1 * | 10/2002 | ........... B60N 2/4673 |
| FR | 2407093 A1 * | 5/1979 | |
| GB | 2281955 A * | 3/1995 | ............. B60K 26/02 |
| JP | 2002-120590 A | 4/2002 | |
| JP | 2006028953 A * | 2/2006 | |
| JP | 4680845 B2 * | 5/2011 | |
| WO | WO-2018047266 A1 * | 3/2018 | ............. B60K 26/02 |

* cited by examiner

*Primary Examiner* — Adam D Rogers
(74) *Attorney, Agent, or Firm* — Xsensus LLP

(57) ABSTRACT

A brake operation portion that allows a manual brake operation is included in a vehicle cabin, the brake operation portion includes a grip portion, and an elbow rest member is provided at, in the vehicle rear side of the grip portion, a position on which an elbow of a driver can abut in a state in which the driver grips the grip portion so as to be capable of operating the grip portion. Thus, even a physically disabled driver may freely perform a driving operation and easily manually perform a delicate brake operation.

9 Claims, 8 Drawing Sheets

DRIVING ASSISTANCE APPARATUS

CROSS-REFERENCE TO RELATED APPLICATION

This application claims priority to Japanese Application No. 2021-003547, filed Jan. 13, 2021, the entire contents of which are incorporated herein by reference.

TECHNICAL FIELD

The present disclosure relates to a driving assistance apparatus for physically handicapped people, and relates to a driving assistance apparatus that allows a person with a lower limb disability seated on a driver seat to manually perform a brake operation using a brake operation portion included in a vehicle cabin.

BACKGROUND

A vehicle including an operation lever that allows a manual brake operation has been conventionally known. For example, see Japanese Patent Laid-Open No. 2002-120590 ("Patent Literature 1").

In the vehicle in Patent Literature 1, even a driver with a lower limb disability can perform a manual brake operation, and thus various brake operation mechanisms such as the technique of Patent Literature 1 have been developed.

In the brake operation mechanism for manually performing a brake operation as described above, a driver uses both of his or her upper arm and forearm during the brake operation to perform the operation using his or her shoulder as a pivot; accordingly, in a scene in which a fine brake operation state is held, it is difficult to hold a pushing amount of the arm constant, and there is a concern that a delicate brake operation cannot be performed.

In addition, for example, in a configuration in which a steering operation, an acceleration operation, a shift change operation, and the like are also manually performed, in the case where it is difficult to manually perform a delicate brake operation as described above, these operations such as the steering operation are also negatively affected, and there is also a concern that a physically disabled driver is restricted from freely performing a manual driving operation.

On the other hand, when a driver such as a healthy person performs a brake operation with his or her foot using a foot brake, the driver performs a delicate brake operation by causing a heel of the foot to be grounded on a floor and depressing a brake pedal using the heel as a pivot.

In order to solve the above problem, the inventors of the present disclosure have focused on a difference between the manual brake operation and the brake operation using the foot brake described above and have conducted earnest studies for a structure that allows a driver to easily manually perform a delicate brake operation.

SUMMARY

An object of embodiments of the disclosure is to provide a driving assistance apparatus that allows even a physically disabled driver to freely perform a driving operation and easily manually perform a delicate brake operation.

A driving assistance apparatus in embodiments of the present disclosure is a driving assistance apparatus including, in a vehicle cabin, a brake operation portion that allows a manual brake operation, the brake operation portion including a grip portion, and the apparatus is characterized in that an elbow rest member may be provided at, in the vehicle rear side of the grip portion, a position on which an elbow portion of a driver can rest in a state in which the driver grips the grip portion so as to be capable of operating the grip portion.

According to such a configuration, in some embodiments, the brake operation may be performed by placing the self-weight of an upper arm of the driver on the elbow rest member and adjusting the angle of his or her forearm using his or her elbow supported by the elbow rest member as a pivot, so that it is not necessary to move the whole arm, and accordingly it is possible to delicately control the braking force with the forearm.

Accordingly, even a physically disabled driver can freely perform a driving operation and easily manually operate a delicate brake operation with his or her foot which is performed using a foot brake, in embodiments of the disclosure.

As an aspect of embodiments of the present disclosure, an elbow rest face of the elbow rest member may be provided toward the driver side in the vehicle width direction, and the elbow rest face may be provided inclinedly so as to be located on the driver side as it goes downward.

According to such a configuration, in some embodiments, regardless of the physique of the driver, it is possible to cause the elbow portion of the driver to firmly rest on the elbow rest face while the driver holds a driving posture appropriate for the brake operation. Thus, it is possible to easily perform a strong brake operation.

Furthermore, it is possible to cause the elbow portion of the driver to firmly rest on the elbow rest face without adjustment of, in the elbow rest face, a position (a height and a vehicle-width-direction position) of a point against which the elbow of the driver appropriately hits, according to the physique of the driver, and it is possible to omit inconvenience of the adjustment.

As an aspect of embodiments of the present disclosure, at least a part of an elbow rest face of the elbow rest member may be provided above an armrest provided in a center console of a vehicle.

According to such a configuration, in some embodiments, the driver can perform the brake operation while holding an appropriate driving posture without leaning against the center console side as in the case of placing the forearm on the armrest.

As an aspect of embodiments of the present disclosure, the elbow rest member may be formed so as to be capable of being mounted on a cup holder provided in a center console.

According to such a configuration, in some embodiments, in the case where the driver does not require the manual brake operation, it is possible to remove the elbow rest member from the vehicle body.

Thus, in embodiments of the disclosure, even a physically disabled driver can freely perform the driving operation and easily manually operate the delicate brake operation.

DETAILED DESCRIPTION

Hereinafter, embodiments of the present disclosure will be described in detail based on the drawings.

In the figures, arrow F indicates the vehicle front side; arrow U, the vehicle upper side; arrow R, the vehicle right side; arrow L, the vehicle left side; arrow X, the axis direction of a steering wheel; arrow Xu, the upper side of the axis direction of the steering wheel (driver side); arrow Xd, the lower side of the axis direction of the steering wheel (the opposite side of the driver side).

As illustrated in the embodiment of FIGS. 1 to 4, a vehicle is a right-hand drive vehicle and includes a brake manual operation apparatus 10 that allows a driver with a lower limb disability who has difficulty in a depression operation of a brake pedal or an accelerator pedal with his or her foot to manually perform a brake operation in a state of being seated on a driver seat 8, and an accelerator manual operation apparatus 30 (see FIGS. 2 and 4) that allows the driver to manually perform an acceleration operation in a state of being seated on the driver seat 8.

Note that the brake manual operation apparatus 10 of corresponds to a driving assistance apparatus in some embodiments, as discussed further below.

The brake manual operation apparatus 10 and the accelerator manual operation apparatus 30 may be incorporated into a base vehicle by modifying the base vehicle. The brake manual operation apparatus 10 and the accelerator manual operation apparatus 30 will be described hereinafter, but prior to that, a description will be given of a schematic structure of the base vehicle.

Figure 2:
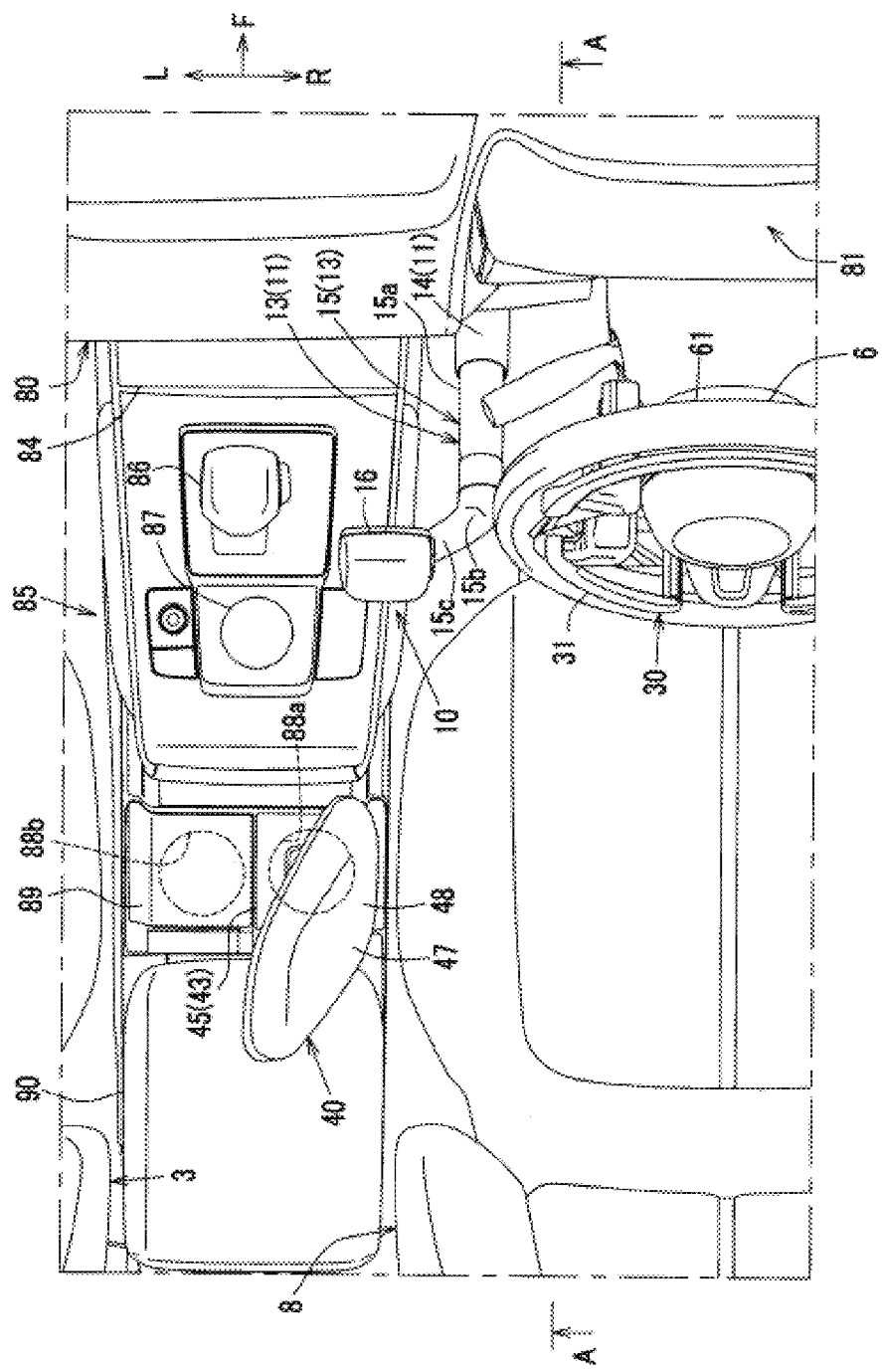
FIG. 2 is a plan view of the inside of the vehicle cabin in which the operation bar and the elbow rest member included in the brake manual operation apparatus of the present embodiment are installed.
Figure 3:
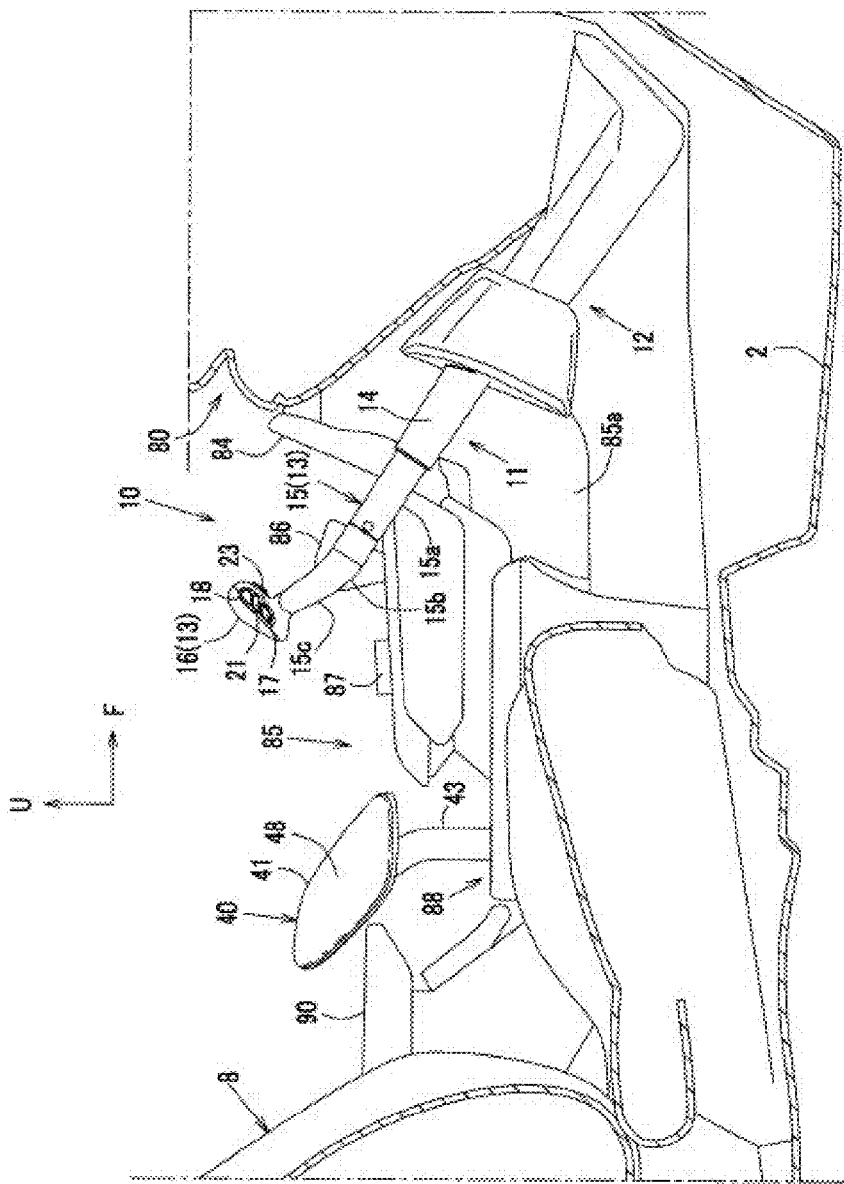
FIG. 3 is a cross-sectional view of a main portion taken along line A-A of FIG. 2.
Figure 4:
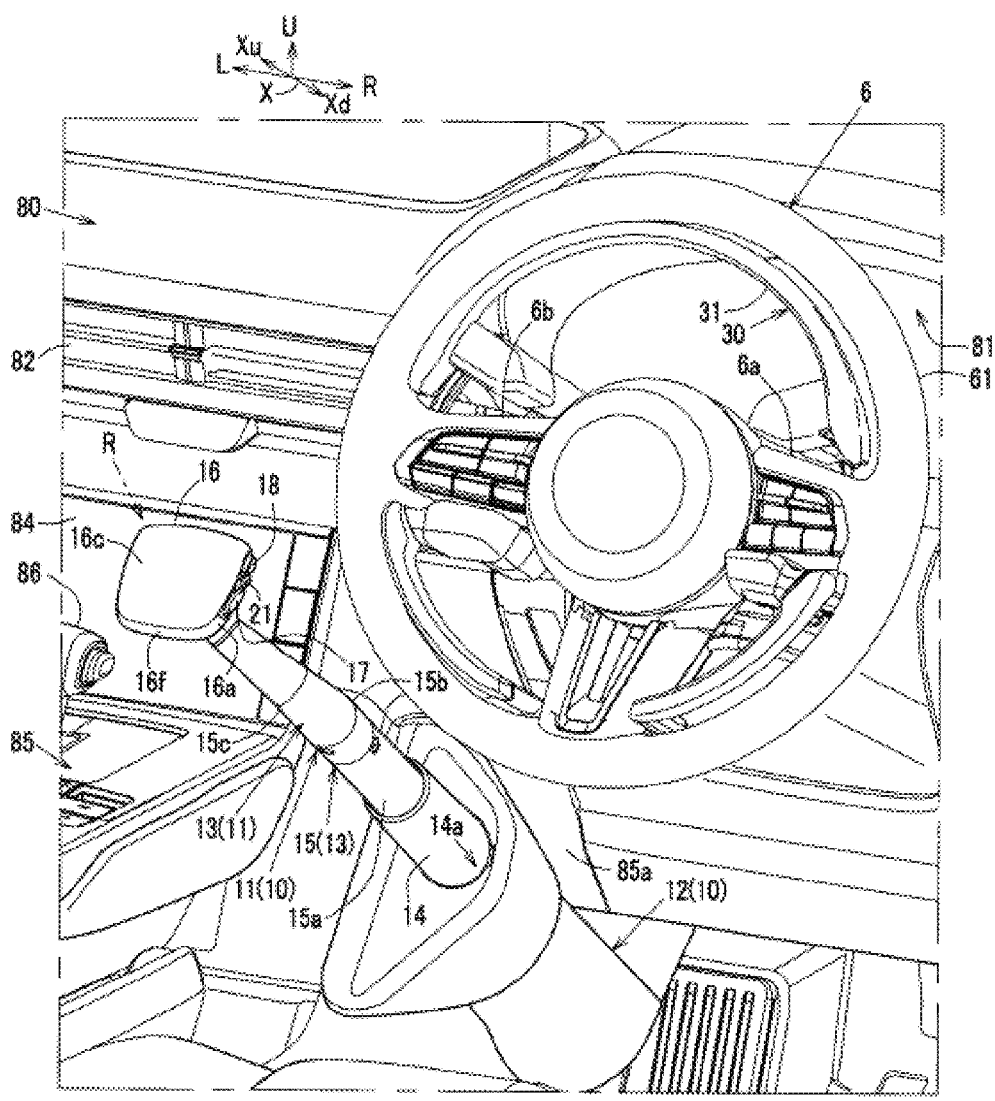
FIG. 4 is an external view of the operation bar included in the brake manual operation apparatus of the present embodiment, as viewed from the driver seat side.

The driver seat 8 and a passenger seat 3 are mounted on the respective right and left sides of a front portion of a floor panel 2 (see FIG. 3) of a vehicle cabin in the vehicle, and as illustrated in FIGS. 2 and 4, a steering wheel 6 that is operated in a state of being gripped by a driver seated on the driver seat 8 is provided in front of the driver seat 8.

Furthermore, although illustration is omitted, the steering wheel 6 may include a paddle shift switch formed by a pair of a shift-up switch for upshift and a shift-down switch for downshift.

In this example, the shift-up switch is included on a rear face of a right-side spoke portion 6a, and the shift-down switch is included on a rear face of a left-side spoke portion 6b (illustration omitted).

As illustrated in the embodiment of FIGS. 1 to 4, an instrument panel 80 may be provided in a front end of the vehicle cabin over the whole vehicle width direction of the vehicle cabin. A center console 85 extending in the front-rear direction may be provided between the driver seat 8 and the passenger seat 3 in the front portion of the floor panel 2 of the vehicle cabin. The instrument panel 80 and the center console 85 both may form a part of an interior member of the vehicle cabin, and a front portion of the center console 85 may be integrally connected to a vehicle-width-direction center portion of the instrument panel 80.

Figure 1:
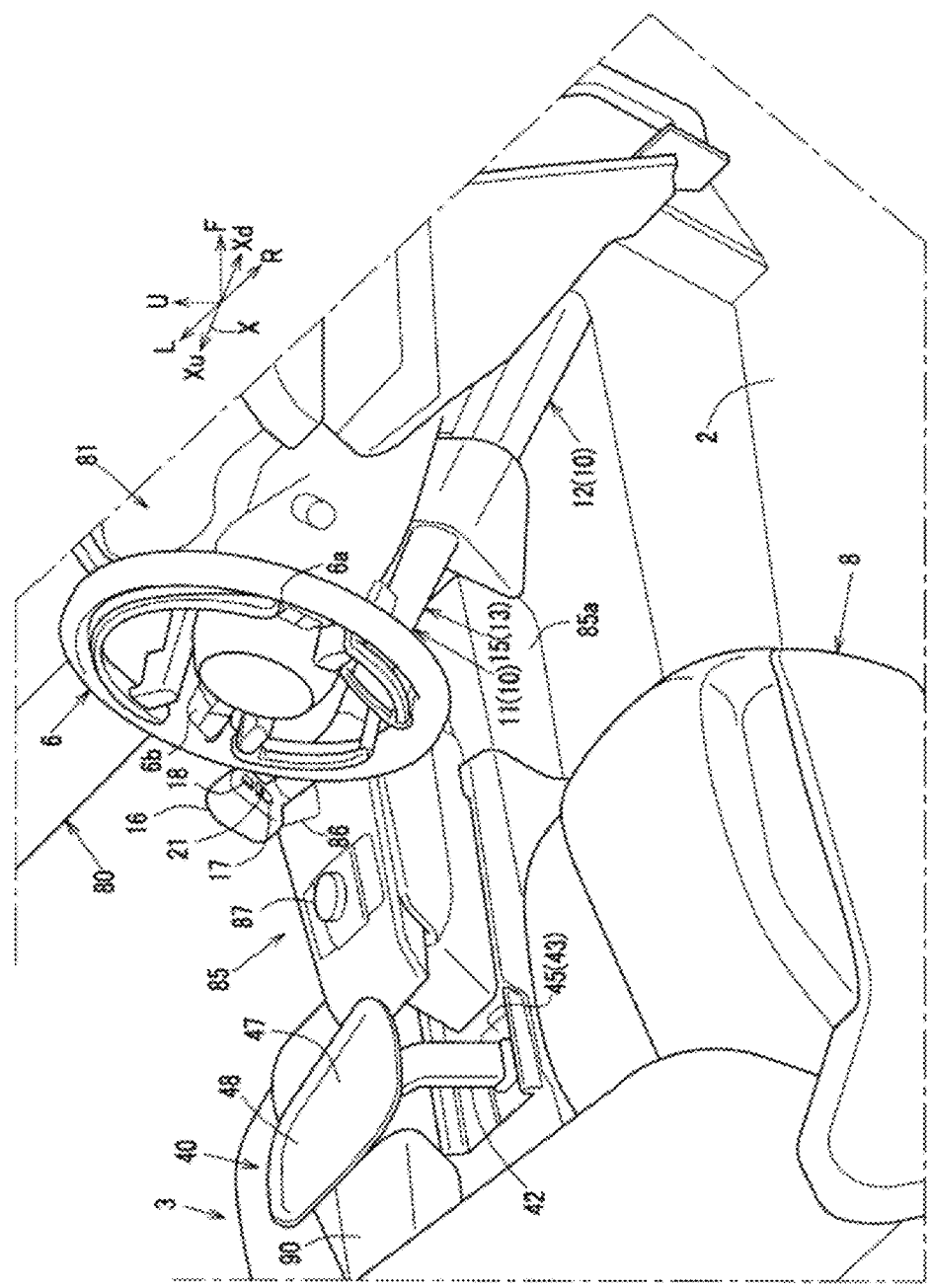
FIG. 1 is an external view of the inside of a vehicle cabin in which an operation bar and an elbow rest member included in a brake manual operation apparatus of the present embodiment are installed, as viewed from the driver seat side.

As illustrated in the embodiment of FIGS. 1 to 3, on an upper face of the center console 85 extending in the front-rear direction, various operation portions such as a shift knob 86 for a gear-shifting operation and a start switch 87, cup holders 88a and 88b (see FIG. 2), and an armrest 90 may be provided in this order from the front side to the rear side.

Note that, as illustrated in the embodiment of FIG. 2, each of the cup holders 88a and 88b may be formed in a recess shape such that a drink container can be placed thereon, and includes a lid 89 that opens and closes an opening thereof. In this example, the cup holder 88b for an occupant seated on the passenger seat 3 and the cup holder 88a for the driver are disposed in parallel on the respective left and right sides in an intermediate region between the various operation portions and the armrest 90 in the front-rear direction on the upper face of the center console 85. Note that FIG. 2 illustrates only the lid 89 included in the cup holder 88b for the occupant.

The intermediate region on the upper face of the center console 85 is not limited to being formed in a recess shape as the cup holders 88a and 88b as in the present embodiment and, for example, may be formed in a recess shape as a box portion that houses small items or omitted altogether.

As illustrated in FIGS. 1, 2, and 4, a display portion 81 of various measurement instruments such as a tachometer and a speed meter may be disposed in front of the driver seat 8 in the instrument panel 80 so as to be visible through the steering wheel 6, an air conditioning outlet 82 may be disposed above a connection portion of the left side of the display portion 81 and the front portion of the center console 85, and a display 84 of a navigation device is provided below the air conditioning outlet 82.

Note that an accelerator pedal (illustration omitted) may be provided at a position at which a right foot of the driver seated on the driver seat 8 is placed, on the floor panel 2 in front of the driver seat 8 in the vehicle cabin, and a brake pedal (illustration omitted) may be provided near the left side from the accelerator pedal (vehicle-width-direction center side).

In some embodiments, the accelerator pedal may be an organ-type pedal that operates a throttle valve of an engine, and the brake pedal may be a suspended-type pedal that operates a brake, both of which are typical pedals included in the base vehicle.

Hereinafter, the brake manual operation apparatus 10 used in some embodiments will be described.

As illustrated in the embodiment of FIGS. 1 to 4, the brake manual operation apparatus 10 may be installed on the left side with respect to the steering wheel 6 in the vicinity of the front side of the driver seat 8, that is, in the vicinity of a right wall 85a (see FIG. 3) of a connection portion of the center console 85 and the instrument panel 80.

As illustrated in FIGS. 1, 3, and 4, an upper portion of the brake manual operation apparatus 10 may include a brake operation unit 11, and a lower portion of the brake manual operation apparatus 10 includes an operation amount transmission unit 12. Furthermore, as illustrated in FIGS. 1 to 4, the brake operation unit 11 may include an operation bar 13 and an axially supporting portion 14.

The operation bar 13 may be made of a metal pipe material (a so-called round pipe) having a circular orthogonal cross-section in the axis direction and may be disposed in a posture inclined in a front-low rear-high shape. Specifically, an upper portion of the operation bar 13 may be located at a height at which the driver seated on the driver seat 8 can operate the operation bar 13 with his or her left hand, at a position in the vicinity of the left side with respect to the steering wheel 6 (see FIG. 2). Furthermore, as illustrated in FIGS. 1 and 3, the operation bar 13 may extend in the front-lower direction toward the floor panel 2 in the vicinity of the front side of the driver seat 8.

A lower portion of the operation bar 13 may be axially supported by the axially supporting portion 14 such that the operation bar 13 is slidably displaced in the front-lower direction with respect to the axially supporting portion 14 by being subjected to a pushing operation (that is, a brake operation) in the front-lower direction along the axis direction of the operation bar 13.

The operation bar 13 slides in the axis direction between a neutral position and a maximum pushing position at which the operation bar 13 is further pushed from the neutral position by a predetermined length in the front-lower direction. Note that the operation bar 13 illustrated in FIGS. 1 to 4 illustrates a state of being disposed in the neutral position.

The operation amount transmission unit 12 may intervene between the brake operation unit 11 and the brake pedal (illustration omitted) and may be configured to transmit to the brake pedal an operation force (operation amount) of the sliding displacement of the operation bar 13 in the front-lower direction. That is, the brake pedal included in the base vehicle may be configured to operate in conjunction with sliding movement of the operation bar 13 in the axis direction due to the manual brake operation.

Thus, the brake manual operation apparatus 10 can activate the brake by rotating the brake pedal at a depression amount according to a sliding amount (pushing amount) of the operation bar 13 in the front-lower direction during the manual brake operation using the operation bar 13.

Furthermore, similarly to the brake pedal, the operation bar 13 may be biased to the neutral position, and the neutral positions of the operation bar 13 and the brake pedal may be associated with each other. Thus, when pushing of the operation bar 13 from the neutral position in the front-lower direction is released by the driver, the operation bar 13 and the brake pedal are simultaneously restored to the respective neutral positions.

The operation bar 13 included in the brake manual operation apparatus 10 of the present embodiment may be formed by integrating an operation bar body 15 and a grip portion 16 provided at an upper end of the operation bar body 15.

The operation bar body 15 may be integrally formed having a base portion 15a and an inclined portion 15c linearly extending so as to be inclined to the vehicle-width-direction outer side as it goes upward, via a bent portion 15b from an upper end of the base portion 15a.

The base portion 15a may extend in a direction coinciding with the front-rear direction in a vehicle plan view, linearly extends in a posture inclined in a front-low rear-high shape coaxially with the axially supporting portion 14, and may be formed with the same diameter along the axis direction. A lower portion of the base portion 15a may be axially supported in a state of being fitted in the axially supporting portion 14 through an opening open toward the rear upper side of the axially supporting portion 14 in a tubular shape.

The inclined portion 15c may be inclined in a front-low rear-high shape similarly to the base portion 15a, while the inclined portion 15c may be inclined in the front-low rear-high shape in a steeper posture (rising posture) than the base portion 15a and, as described above, may extend so as to be inclined to the vehicle-width-direction outer side as it goes upward.

Thus, the inclined portion 15c may support the grip portion 16 from therebelow in a manual operation region (a position corresponding to a boundary portion between the center console 85 and the floor panel 2 in a plan view) (see FIG. 2). Note that the inclined portion 15c may have a lower end formed with the substantially same diameter as the base portion 15a, and may be formed in a tapered shape as it goes upward.

As illustrated in FIGS. 1, 3, and 4, a plurality of operation buttons for the driver to perform various operations while gripping the grip portion 16 may be disposed on the grip portion 16.

Specifically, a brake lock switch 17 and a hazard switch 18 may be disposed on a right-side face 16a of the grip portion 16.

The brake lock switch 17 can lock and hold a brake state when the brake is in an activated state. That is, the brake lock switch 17 may be pressed in a state in which the operation bar 13 for the brake operation is pushed down, and thereby can hold the operation bar 13 in the pushed down state. The brake lock switch 17 may be pressed again and thereby can release the brake state.

In some embodiments, similarly to a hazard switch (illustration omitted) provided in front of the driver seat 8 in the instrument panel 80, the hazard switch 18 can blink a hazard lamp (emergency blinking lamp) by being pressed by the driver and thereby can alert people around the vehicle and notify them of danger.

Note that the hazard switch 18 may be configured to stop the blinking of the hazard lamp by being pressed again.

Furthermore, as illustrated in the embodiment of FIG. 3, a paddle shift switch 23 may be provided on a front lower face 16d of the grip portion 16 (a back face on the non-driver side). Note that, although illustration is omitted, the paddle shift switch 23 may be a seesaw-type switch in which a shift-down switch for shift-down and a shift-up switch for shift-up are disposed side by side in a pair.

Furthermore, as illustrated in the embodiment of FIGS. 1, 2, and 4, the accelerator manual operation apparatus 30 may include an accelerator lever 31 as an acceleration operation member disposed in the vicinity of the radially inner side with respect to a rim portion 61 of the steering wheel 6.

The accelerator lever 31 may be configured to be capable of being pushed downward in the steering axis direction (non-driver side) from a neutral position by the driver using, for example, a thumb of his or her hand gripping the steering wheel 6. Furthermore, the accelerator lever 31 may be biased to the neutral position (upward) so as to be capable of being restored to the neutral position from a position at which the accelerator lever 31 is pushed from the neutral position.

Thus, in some embodiments, the driver can perform a pushing operation of the accelerator lever 31 between the neutral position and a maximum pushing position at which the accelerator lever 31 is pushed by a predetermined length, and according to the pushing amount, the driver can perform an opening operation of the throttle valve of the engine, that is, an acceleration and deceleration operation of the vehicle.

As illustrated in the embodiment of FIGS. 1 to 3, on the vehicle rear side of the grip portion 16 in the vehicle cabin and at a position corresponding to an elbow portion of a left arm of the driver in a state in which the driver grips the grip portion 16 so as to be capable of operating the operation bar 13, an elbow rest member 40 that allows abutment of the elbow portion may be provided.

The elbow rest member 40 may be provided in a protruding manner at a position corresponding to the cup holder 88a for the driver in the center console 85 (that is, a position near the driver side in the vehicle width direction of the center console 85).

As illustrated in FIGS. 1 and 3, the elbow rest member 40 may be formed having an elbow rest member body 41, a support frame 42, and a vehicle body mounting portion 43.

Figure 5:
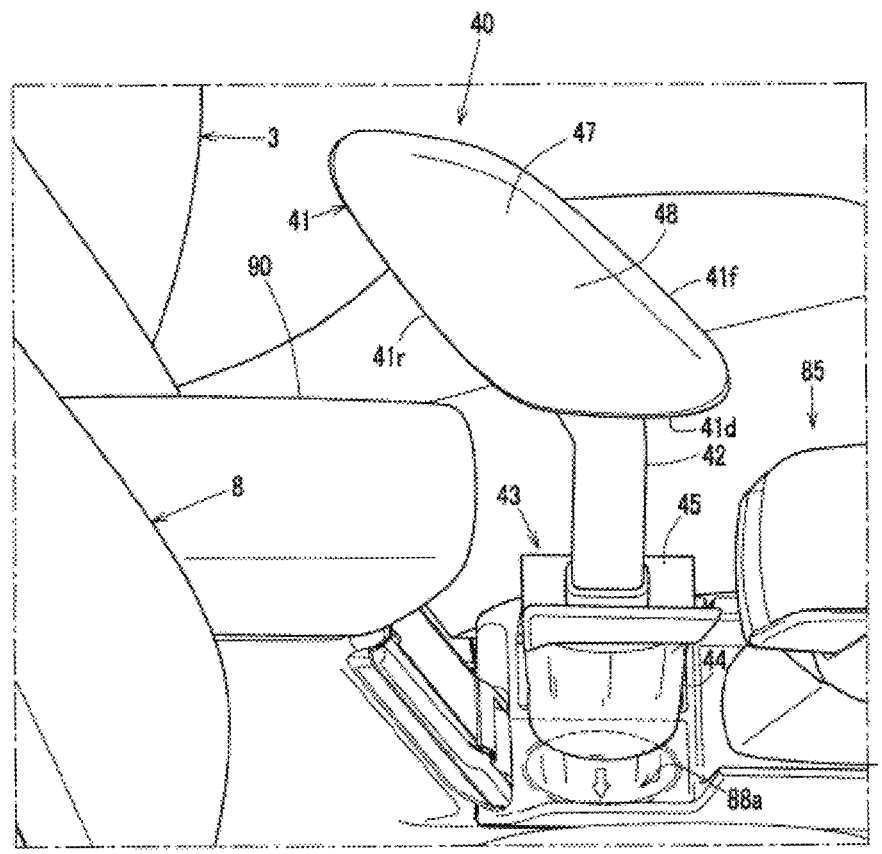
FIG. 5 is an external view illustrating a situation in which the elbow rest member included in the brake manual operation apparatus of the present embodiment is mounted on a vehicle body, as viewed from the driver seat side.
Figure 7:
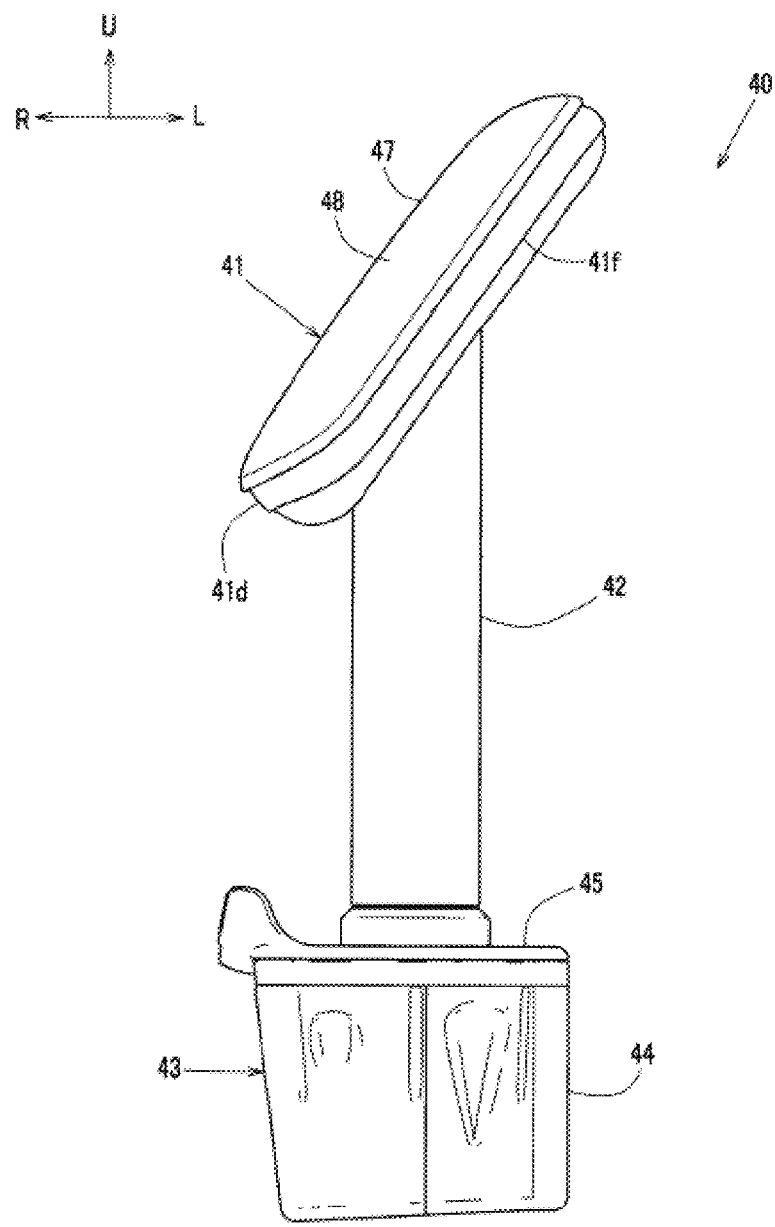
FIG. 7 is a front view of the elbow rest member included in the brake manual operation apparatus of the present embodiment.

As illustrated in FIGS. 5 and 7, the vehicle body mounting portion 43 may include a core material (illustration omitted) integrally formed with the support frame 42, an exterior member 44 externally provided on the core material, and a trim panel 45 installed on an upper face of the exterior member 44.

The core material, although illustration is omitted, may be formed of a metal frame forming a framework of the vehicle body mounting portion 43, or the like. In the present embodiment, the support frame 42 described later may be extended downward to a section corresponding to the vehicle body mounting portion 43, and this downward extended portion may be the core material for the vehicle body mounting portion 43 (illustration omitted).

The exterior member 44 may be formed of an elastic member such as urethane and may be attached to mainly an outer periphery of the core material. Thus, the diameter of the vehicle body mounting portion 43 may be formed slightly larger than the inner diameter of the cup holder 88a in a recess shape. However, the length of the vehicle body mounting portion 43 in the up-down direction may be formed shorter than the depth of the cup holder 88a. The trim panel 45 (dummy lid) may be formed in a plate shape having a size corresponding to the lid (illustration omitted) included in the cup holder 88a for the driver.

In mounting the elbow rest member 40 on a vehicle body, the lid of the cup holder 88a for the driver may be removed to bring the cup holder 88a into an open state, and as indicated by a white arrow in FIG. 5, the vehicle body mounting portion 43 may be fitted in the recess cup holder 88a through the opening, so that the vehicle body mounting portion 43 may be fitted and held in the cup holder 88a. Note that, in the state in which the vehicle body mounting portion 43 may be fitted and held in the cup holder 88a, the trim panel 45 may be in a state of being installed at a position corresponding to the lid of the cup holder 88a for the driver before the elbow rest member 40 is mounted on the vehicle body.

Furthermore, the elbow rest member 40 can be removed from the vehicle body by withdrawing the vehicle body mounting portion 43 from the cup holder 88a, and the cup holder 88a may be restored to a recess form such that a drink container can be placed thereon.

In the state in which the vehicle body mounting portion 43 is mounted on the cup holder 88a for the driver, as illustrated in FIGS. 1 and 3, the support frame 42 may be provided in a protruding manner from a position corresponding to the cup holder 88a for the driver.

As illustrated in FIG. 7, the whole support frame 42 except for an upper portion thereof may extend in the up-down direction (vertical direction), and as illustrated in FIGS. 1, 3, and 5, the upper portion of the support frame 42 may be provided at an incline so as to be located rearward as it goes upward. The support frame 42 has an upper end portion mounted on a lower portion of the elbow rest member body 41 and supports the elbow rest member body 41 from immediately thereunder (see FIG. 7).

The elbow rest member body 41 may be formed in a plate shape including a frame (illustration omitted), a cushion pad, and a trim cover 47 covering the frame and the cushion pad (illustration omitted), and one face (right face) of the elbow rest member body 41 may be disposed so as to substantially face the driver (driver seat 8) in the vehicle width direction.

The frame may be made of a metal material or a relatively hard resin material and forms a framework of the elbow rest member body 41. The cushion pad may be made of, for example, a foamed material such as a flexible urethane foam and may be connected to the frame while covering at least a right face of the frame (a face on the side substantially facing the driver).

The trim cover 47 may be made of, for example, a skin material such as leather (natural leather, synthetic leather) or fabric (knit, woven fabric, non-woven fabric), has a right face skin disposed on the right face of the elbow rest member body 41, a left face skin disposed on a left face of the elbow rest member body 41, and a gusset skin connecting the right face skin and the left face skin, and may be formed by suturing these skins.

The right face of the elbow rest member body 41 in the vehicle width direction may be formed as an elbow rest face 48. The elbow rest face 48 may secure flexibility by the cushion pad covering the right face of the frame, so as not to hurt the driver when resting his or her elbow.

Figure 6:
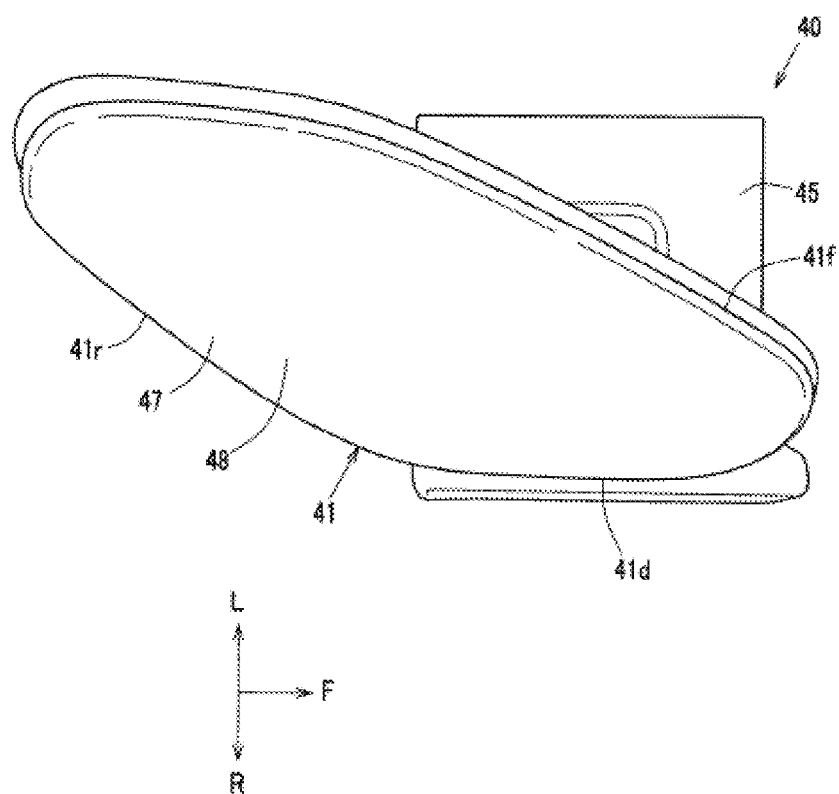
FIG. 6 is a plan view of the elbow rest member included in the brake manual operation apparatus of the present embodiment.

As illustrated in FIGS. 2, 6, and 7, the elbow rest member body 41 may be supported by the support frame 42 in a posture in which the elbow rest face 48 is inclined so as to be located on the driver (driver seat 8) side in the vehicle width direction as it goes downward. In other words, the elbow rest face may be inclined down toward the driver side in the vehicle width direction.

In this example, the elbow rest face 48 may be inclined at an inclination angle of about 35 degrees with respect to the vertical direction in a vehicle front view such that the upper side thereof is located on the passenger seat 3 side and the lower side thereof is located on the driver seat 8 side. However, the inclination angle of the elbow rest face 48 can be set to any angle at which an elbow portion of a left arm of the driver easily rests on the elbow rest face 48 in a state in which the driver grips the grip portion 16.

As illustrated in FIG. 2, the elbow rest member body 41 may be disposed at a position in the vicinity of the left side of a seat portion of the driver seat 8 in a plan view, and the lower portion of the elbow rest member body 41 may be disposed so as to overlap with at least a part of the grip portion 16 in the vehicle width direction. In this example, the elbow rest member body 41 may be disposed at a position on the slightly left side with respect to the grip portion 16. The armrest 90 may be installed on the rear side of the elbow rest member body 41, and as illustrated in FIG. 3, the whole elbow rest member body 41 except for the lower portion thereof in the up-down direction may be formed higher so as to project upward from an upper face of the armrest 90. Only an upper portion of the elbow rest member body 41 may be disposed at the substantially same (overlapping in the up-down direction) height as the grip portion 16 (see FIG. 3).

Furthermore, as illustrated in FIGS. 1 and 3, the elbow rest member body 41 may be inclined so as to be located on the vehicle rear side as it goes upward, and may be formed in a substantially parallelogram shape in which each of corner portions thereof is formed in a rounded shape in a vehicle side view.

Specifically, as illustrated in FIGS. 5 and 7, a lower side 41d of the elbow rest member body 41 may be linearly formed substantially horizontally in the vehicle front-rear direction, and as illustrated in FIGS. 5 and 6, a rear side 41r and a front side 41f may be both inclined so as to be located on the vehicle rear side as they go upward, and linearly extend in parallel to each other.

As illustrated in the embodiment of FIGS. 1 to 4, the operation bar 13 (brake operation portion) that allows the manual brake operation may include grip portion 16. And, as illustrated in FIGS. 1 to 3, the elbow rest member 40 may be provided, in the vehicle rear side of the grip portion 16, at a position on which the elbow portion of the driver can rest in a state in which the driver grips the grip portion 16 so as to be capable of operating the operation bar 13.

According to the configuration, the brake operation may be performed by placing the weight of an upper arm of the driver on the elbow rest member body 41 in the elbow rest member 40 and adjusting the angle of his or her forearm using the elbow supported by the elbow rest member body 41 as a pivot, so that it is not necessary to move the whole left arm, and accordingly it is possible to delicately control the braking force with the forearm.

Accordingly, even a physically disabled driver can easily manually operate a delicate brake operation with his or her foot which is performed using a foot brake, in some embodiments.

Furthermore, according to such a configuration in embodiments of the disclosure, during the brake operation using the operation bar 13, even a physically disabled driver does not need to lose his or her posture and can maintain a comfortable driving posture. Thus, for example, the driver also can easily manually perform a steering operation, an acceleration operation, a shift change operation, and the like and consequently can freely perform a driving operation.

A description will be given of a procedure and a method for a large driver Dm in FIG. 8 to perform the brake operation using the operation bar 13 in a state of his or her elbow hitting against the elbow rest member body 41, in some embodiments. First, during the brake operation, the driver Dm pushes the operation bar 13 in the front-lower direction using the elbow of his or her left arm hitting against the elbow rest face 48 of the elbow rest member body 41 as a starting point. Thus, an armpit opening is suppressed in any sides in a front view and side view of the driver Dm, and the driver Dm can push his or her forearm while maintaining a comfortable driving posture without losing the driving posture.

Furthermore, when the driver Dm pushes the forearm in the front-lower direction by pushing the operation bar 13 with his or her left hand, while the elbow of the left arm is guided along the elbow rest face 48 while maintaining a state of resting on the elbow rest member body 41, the forearm may be pushed in the front-lower direction. Thus, the operation track of the left hand in the front-lower direction during the brake operation can be assisted by the elbow rest member body 41, and consequently unnecessary movement such as a wobble of the left hand of the driver Dm may be suppressed, enabling operations and control of the operation bar 13 with a lesser loss.

As an aspect of embodiments of the present disclosure, as illustrated in FIGS. 1 to 3, 6, and 7, the elbow rest face 48 of the elbow rest member body 41 may be provided toward the driver side in the vehicle width direction, and the elbow rest face 48 may be provided inclinedly so as to be located on the driver side as it goes downward.

According to such a configuration, regardless of the physique of the driver, it is possible to cause the elbow portion of the driver to firmly rest on the elbow rest face 48 while the driver holds a driving posture appropriate for the brake operation. Thus, it is possible to easily perform a strong brake operation in some embodiments.

Furthermore, in some embodiments, it is possible to cause the elbow portion of the driver to firmly rest on the elbow rest face 48 without adjustment of, in the elbow rest face 48, a height of a point against which the elbow of the driver appropriately hits, according to the physique of the driver.

Figure 8:
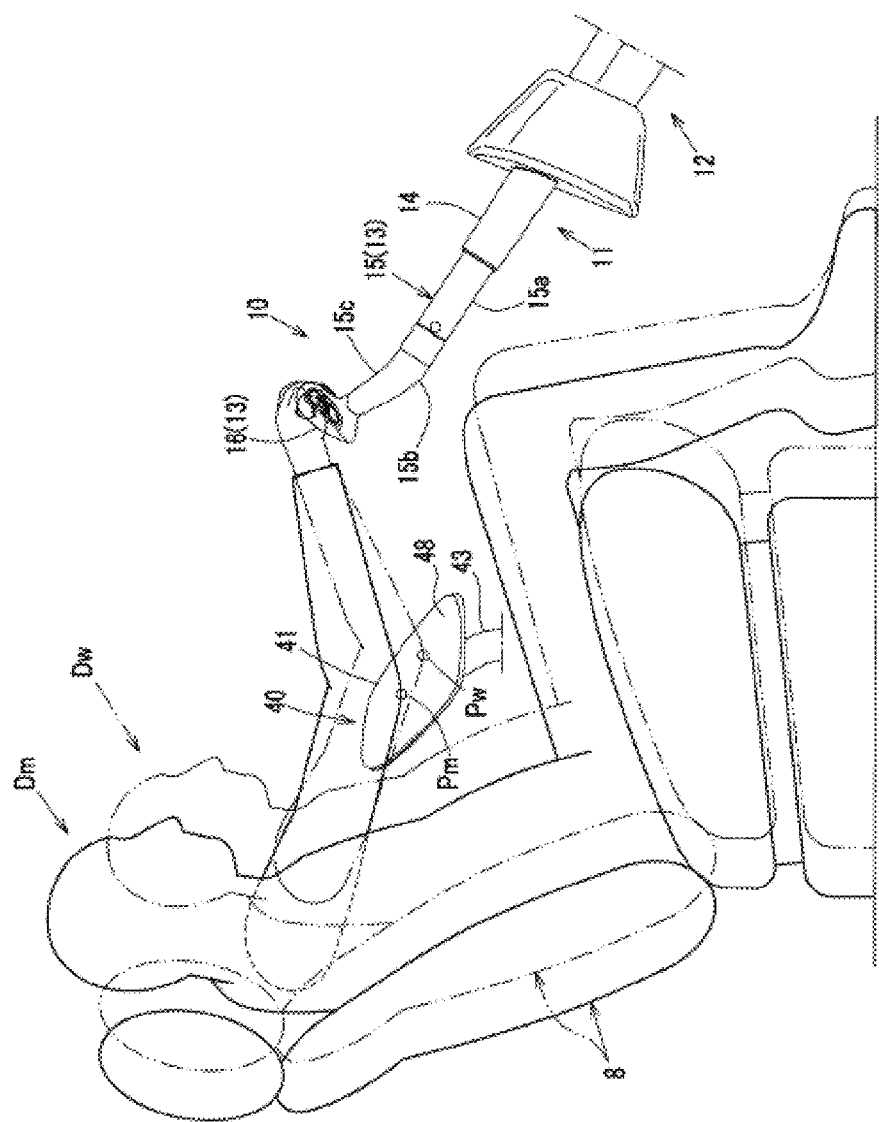
FIG. 8 is an explanatory view of functions of the elbow rest member which illustrates, according to the physique of a driver, a situation in which the driver performs a brake operation using the operation bar in a state of his or her elbow hitting against the elbow rest member.

As described above, the elbow rest face 48 of the elbow rest member body 41 may be provided inclinedly so as to be located on (approach) the driver side as it goes downward, and thus, as indicated by a solid line in FIG. 8, in the case where the physique of the driver Dm is relatively large, an elbow portion of the driver Dm rests on a relatively upward (rear upper) position in the elbow rest face 48 inclined to the driver Dm side as it goes downward (see an elbow rest point Pm in FIG. 8).

On the other hand, as indicated by a virtual line in FIG. 8, in the case where the physique of a driver Dw is relatively small, an elbow portion of the driver Dw rests on a relatively downward (front lower) position in the elbow rest face 48 inclined to the driver Dw side as it goes downward (see an elbow rest point Pw in FIG. 8).

As described above, the elbow rest face 48 of the elbow rest member body 41 may be provided inclinedly so as to be located on the driver side as it goes downward, and thus, regardless of the physique of the driver, it is possible to cause the elbow portion of the driver to firmly rest (be supported) at the elbow rest point Pm or Pw in the elbow rest face 48 which is appropriate for the driver to perform the brake operation.

Accordingly, the driver, regardless of the physique, can easily perform a strong brake operation while holding the driving posture, that is, while holding a posture of performing a normal brake operation in a state of gripping the grip portion 16 by stretching the left arm forward.

Furthermore, the driver can cause the elbow to rest on an appropriate elbow rest point without adjustment of a position of the elbow rest point (a height and vehicle-width-direction position of a point against which the elbow hits) in the elbow rest face 48 according to the physique of the driver and can utilize the elbow rest member body 41 without inconvenience of the adjustment of the elbow rest point.

Furthermore, the elbow rest face 48 of the elbow rest member body 41 may not be a horizontal face as in, in the armrest 90, the upper face on which the arm of the driver is placed, but is provided so as to face the driver side in the vehicle width direction. Thus, it is possible to cause the elbow portion of the left arm of the driver to firmly hit against the elbow rest face 48 when the driver pushes the operation bar 13 in the front-lower direction in a state of gripping the grip portion 16 during the brake operation with the left hand. Thus, it is possible to firmly suppress escape of the elbow portion of the left arm of the driver to the passenger seat 3 side from the position of the elbow rest face 48 in the vehicle width direction. That is, it is possible to suppress opening of the armpit angle of the left arm of the driver in a vehicle front view and control a delicate brake with the forearm.

As an aspect of the present invention, as illustrated in FIG. 3, at least a part of the elbow rest face 48 of the elbow rest member body 41 (a substantial elbow rest portion in the elbow rest face 48) may be provided above the armrest 90 provided in the center console 85 of the vehicle.

Specifically, in the elbow rest member body 41, an upward portion of the elbow rest face 48 at least from an intermediate position thereof in the up-down direction may be provided above the upper face of the armrest 90. Furthermore, as illustrated in FIG. 2, the elbow rest member body 41 may be provided at a position on the vehicle front side from the armrest 90 and a position near the driver side in the vehicle width direction.

According to such a configuration, when the driver places the elbow on the elbow rest member body 41, the driver can perform the brake operation while holding an appropriate driving posture without leaning against the center console 85 side as in the case of placing the forearm on the armrest 90.

As an aspect of embodiments of the present disclosure, as illustrated in FIGS. 1, 2, and 5, the elbow rest member 40 is formed so as to be capable of being mounted on the cup holder 88a for the driver provided in the center console 85.

According to such a configuration, it is possible to easily attach and detach the elbow rest member 40 only by inserting and extracting the elbow rest member 40 into and from the recess cup holder 88a. Thus, for example, in the case where the driver is a healthy person who does not require the manual brake operation, it is possible for the driver to remove the elbow rest member 40 from the vehicle body, and thus it becomes easier to utilize the armrest 90. Furthermore, there is no need for adding a large-scale alteration to the base vehicle in mounting the elbow rest member 40 on the vehicle body.

Furthermore, as an aspect of the present invention, as illustrated in FIGS. 1 to 3, 5, and 6, the elbow rest member body 41 in the elbow rest member 40 may be provided so as to be located on the vehicle rear side as it goes upward.

The elbow rest member body 41 may be provided so as to be located on the vehicle rear side as it goes upward, and thus the driver can cause the elbow to reliably rest on the elbow rest face 48 regardless of a difference of the elbow rest point in the front-rear direction and the up-down direction due to a difference of the physique of the driver.

Furthermore, since the elbow rest member body 41 is provided so as to be located on the vehicle rear side as it goes upward, the driver can continue to guide the elbow portion along the track of the elbow portion in the front-lower direction when pushing the operation bar 13 in the front-lower direction from a state of the elbow hitting against the elbow rest point.

For example, as indicated by the solid line in FIG. 8, in the case where the physique of the driver Dm is relatively large, the elbow portion of the driver Dm rests on a relatively rearward (rear upper) position in the elbow rest face 48 (see the elbow rest point Pm in FIG. 8). Furthermore, as indicated by the virtual line in FIG. 8, in the case where the physique of the driver Dw is relatively small, the elbow portion of the driver Dw rests on a relatively forward (front lower) position in the elbow rest face 48 (see the elbow rest point Pw in FIG. 8).

Furthermore, the elbow rest member body 41 need not be large and may be provided in a minimum necessary size so as to be located on the vehicle rear side as it goes upward, and thus the driver would not be hindered by the elbow rest member 40 provided in the center console 85 in accessing various switches provided in the center console 85, the shift knob 86 for the gear-shifting operation, or the start switch 87. Furthermore, it is possible to reduce a cooped-up feeling due to separation between the passenger seat 3 and the driver seat 8 by the elbow rest member 40 provided in a protruding manner between the passenger seat 3 and the driver seat 8.

Furthermore, as an aspect of embodiments of the present disclosure, as illustrated in FIGS. 2 to 4, the grip portion 16 may be included in an upper end of the operation bar 13, and the elbow rest member body 41 may be provided at a position on the vehicle rear side and the vehicle left side from the position of the grip portion 16 included in the upper end of the operation bar 13, in the vehicle width direction (the non-driver side in the vehicle width direction). Furthermore, the inclined portion 15c inclined to the left side as it goes toward the vehicle upper side (the side approaching the elbow rest member body 41 in the vehicle width direction) may be provided at an upper portion of the operation bar body 15 (brake operation body).

According to such a configuration, in a vehicle plan view, the inclined portion 15c provided at the upper portion of the operation bar body 15 can coincide with an orientation of the forearm of the left arm in a plan view which extends toward the vehicle front side and the vehicle-width-direction inner side from the elbow portion of the left arm resting on the elbow rest member body 41 to the left hand.

The inclined portion 15c as described above may be included in the upper portion of the operation bar 13, so that, when the driver brings the elbow portion of the left arm into firmly resting on the elbow rest face 48 and pushes the grip portion 16 (operation bar 13) in the front-lower direction with the left hand, a force of pushing the grip portion 16 (in particular, a force toward the inner direction in the vehicle width direction) can be firmly received by the inclined portion 15c.

Accordingly, in some embodiments, the driver can effectively transfer to the operation bar body 15 the force of pushing the grip portion 16 using the elbow rest face 48 as a pivot of the elbow, consequently enabling a smooth pushing operation of the operation bar 13.

The present disclosure is not limited to only the configurations of the above-described embodiment and can be formed in various embodiments.

REFERENCE SIGNS LIST AND NUMERALS 10 brake manual operation apparatus (driving assistance apparatus)
13 operation bar (brake operation portion)
16 grip portion
40 elbow rest member
48 elbow rest face of elbow rest member
85 center console
88a cup holder for driver (cup holder)
90 armrest

The invention claimed is:

1. A driving assistance apparatus comprising:
in a vehicle cabin of a vehicle, a brake operation portion that allows a manual brake operation, the brake operation portion comprising a grip portion and a brake operation unit;
in a vehicle rear side of the grip portion, an elbow rest member provided at a position such that an elbow of a driver can rest on the elbow rest member in a state in which the driver grips the grip portion so as to be capable of operating the grip portion, wherein a lower portion of the brake operation portion comprises an operation amount transmission unit, an operation bar, and an axially supporting portion, and wherein a lower portion of the operation bar is axially supported by the axially supporting portion, and the operation bar is configured to be slidably displaced in a front-lower direction with respect to the axially supporting portion when subjected to a pushing operation in the front-lower direction along an axis direction of the operation bar.

2. The driving assistance apparatus according to claim 1, wherein an elbow rest face of the elbow rest member is provided toward a driver side in a vehicle width direction, and the elbow rest face is provided at an incline so as to be located on the driver side as the elbow rest face goes downward.

3. The driving assistance apparatus according to claim 2, wherein at least a part of the elbow rest face of the elbow rest member is provided above an armrest provided in a center console of the vehicle.

4. The driving assistance apparatus according to claim 3, wherein the elbow rest member is formed so as to be capable of being mounted on a cup holder provided in the center console.

5. The driving assistance apparatus according to claim 2, wherein the elbow rest member is formed so as to be capable of being mounted on a cup holder provided in a center console.

6. The driving assistance apparatus according to claim 1, wherein at least a part of an elbow rest face of the elbow rest member is provided above an armrest provided in a center console of the vehicle.

7. The driving assistance apparatus according to claim 1, wherein the elbow rest member is formed so as to be capable of being mounted on a cup holder provided in a center console.

8. The driving assistance apparatus according to claim wherein:
- the elbow rest member is fitted and held in a cup holder for the driver in a center console of the vehicle,
- the elbow rest member comprises an elbow rest member body, an elbow rest face, a support frame, and a vehicle body mounting portion,
- the elbow rest member body is supported by the support frame, and
- the elbow rest face is inclined down toward a driver side in a vehicle width direction.

9. The driving assistance apparatus according to claim 8, wherein:
- the elbow rest member body is inclined so as to be located on the vehicle rear side as it goes upward, and
- the elbow rest member body has a substantially parallelogram shape in which each of corner portions thereof is formed in a rounded shape in a vehicle side view.

* * * * *